(12) United States Patent
Moore et al.

(10) Patent No.: US 10,830,296 B2
(45) Date of Patent: Nov. 10, 2020

(54) CERAMIC PREFORM AND METHOD

(71) Applicant: Intellectual Property Holdings, LLC, Cleveland, OH (US)

(72) Inventors: Dan T. Moore, Cleveland Heights, OH (US); Evelyn M. Deliso, University Heights, OH (US); Joseph B. Richey, III, Chagrin Falls, OH (US); Ryan G. Sarkisian, Cleveland, OH (US); Tongzhai Gao, Euclid, OH (US); Andrew Dorman, Cleveland, OH (US)

(73) Assignee: INTELLECTUAL PROPERTY HOLDINGS, LLC, Cleveland, OH (US)

( * ) Notice: Subject to any disclaimer, the term of this patent is extended or adjusted under 35 U.S.C. 154(b) by 246 days.

(21) Appl. No.: 15/494,139

(22) Filed: Apr. 21, 2017

(65) Prior Publication Data

US 2018/0306260 A1    Oct. 25, 2018

(51) Int. Cl.

| | |
|---|---|
| *F16D 65/12* | (2006.01) |
| *B28B 1/52* | (2006.01) |
| *B28B 11/24* | (2006.01) |
| *B22D 19/00* | (2006.01) |
| *B22D 18/02* | (2006.01) |
| *C04B 35/82* | (2006.01) |
| *C04B 35/80* | (2006.01) |
| *C22C 29/02* | (2006.01) |
| *C22C 47/06* | (2006.01) |
| *C04B 35/565* | (2006.01) |
| *C22C 47/08* | (2006.01) |
| *C04B 41/88* | (2006.01) |
| *C04B 41/00* | (2006.01) |
| *C04B 38/06* | (2006.01) |
| *C04B 41/51* | (2006.01) |

(Continued)

(52) U.S. Cl.
CPC .......... *F16D 65/125* (2013.01); *B22D 18/02* (2013.01); *B22D 19/0081* (2013.01); *B28B 1/52* (2013.01); *B28B 11/243* (2013.01); *C04B 35/565* (2013.01); *C04B 35/806* (2013.01); *C04B 35/82* (2013.01); *C04B 38/068* (2013.01); *C04B 38/0675* (2013.01); *C04B 41/009* (2013.01); *C04B 41/5155* (2013.01); *C04B 41/88* (2013.01); *C22C 29/02* (2013.01); *C22C 47/06* (2013.01); *C22C 47/08* (2013.01); *F16D 65/126* (2013.01); *C04B 2111/00362* (2013.01); *C04B 2111/00931* (2013.01); *C04B 2235/3826* (2013.01); *C04B 2235/48* (2013.01); *C04B 2235/5228* (2013.01); *C04B 2235/5264* (2013.01); *C04B 2235/77* (2013.01); *C04B 2235/96* (2013.01); *F16D 2065/1328* (2013.01); *F16D 2065/1344* (2013.01); *F16D 2065/1384* (2013.01); *F16D 2200/003* (2013.01); *F16D 2200/0047* (2013.01); *F16D 2200/0052* (2013.01); *F16D 2200/0065* (2013.01); *F16D 2200/0082* (2013.01); *F16D 2250/003* (2013.01); *F16D 2250/0007* (2013.01); *F16D 2250/0023* (2013.01)

(58) Field of Classification Search
CPC ..... F16D 18/02; B22D 18/02; B22D 19/0081; B28B 1/52; B28B 11/243; C04B 35/565; C04B 35/806; C04B 35/82; C04B 38/0645; C22C 29/02; C22C 47/06; C22C 47/08

See application file for complete search history.

(56) References Cited

U.S. PATENT DOCUMENTS

| | | |
|---|---|---|
| 3,286,974 A | 11/1966 | Dean et al. |
| 3,305,618 A | 2/1967 | Sucher |
| 3,546,060 A | 12/1970 | Dornheim |

(Continued)

FOREIGN PATENT DOCUMENTS

| | | |
|---|---|---|
| CN | 103619778 A | 3/2014 |
| EP | 0223478 A2 | 5/1987 |

(Continued)

OTHER PUBLICATIONS

King. Alan G., et al., "Passage Chapter 6—Forming, Ceramic technology and processing: [ a practical working guide]", Jan. 1, 2002, Ceramic Technology and Processing; [A practical working guide], Noyes Publications/William Andrew Publ., US, pp. 143-167, XP008181889, ISBN:0-8155-1443-3.

(Continued)

*Primary Examiner* — Edward J Cain

(74) *Attorney, Agent, or Firm* — Calfee, Halter & Griswold LLP

(57) ABSTRACT

The present application discloses a ceramic preform, a method of making a ceramic preform, a MMC comprising a ceramic preform, and a method of making a MMC. The method of making a ceramic preform generally comprises preparing reinforcing fibers, preparing a ceramic compound, and forming the compound into a desired shape to create the ceramic preform. In certain embodiments, the ceramic compound is formed as either a disc or a ring for use in a brake disc metal matrix composite. The metal matrix composite generally comprises the ceramic preform infiltrated with a molten metal to form the brake disc metal matrix composite. The method of making the metal matrix composite generally comprises heating the ceramic preform, placing the ceramic preform in a mold cavity of a die cast mold, and introducing molten metal into the mold cavity to infiltrate the ceramic preform to form the brake disc metal matrix composite.

20 Claims, 5 Drawing Sheets

(51) Int. Cl.
*F16D 65/02* (2006.01)
*C04B 111/00* (2006.01)

(56) References Cited

U.S. PATENT DOCUMENTS

| | | | |
|---|---|---|---|
| 3,919,382 A | 11/1975 | Smarook | |
| 3,933,335 A | 1/1976 | Maruyama et al. | |
| 4,039,703 A | 8/1977 | Kamijo | |
| 4,298,556 A | 11/1981 | Rutsch | |
| 4,379,103 A | 4/1983 | Doerfling | |
| 4,587,707 A | 5/1986 | Nishida et al. | |
| 4,830,932 A | 5/1989 | Donomoto et al. | |
| 4,871,008 A | 10/1989 | Dwivedi et al. | |
| 4,998,578 A | 3/1991 | Dwivedi | |
| 5,024,795 A | 6/1991 | Kennedy | |
| 5,167,271 A | 12/1992 | Lange et al. | |
| 5,234,045 A | 8/1993 | Cisko | |
| 5,268,339 A | 12/1993 | Aghajanian | |
| 5,350,004 A | 9/1994 | Rocazella | |
| 5,380,580 A | 1/1995 | Rogers | |
| 5,413,194 A | 5/1995 | Kulis, Jr. et al. | |
| 5,511,603 A | 4/1996 | Brown et al. | |
| 5,529,620 A | 6/1996 | Corbett et al. | |
| 5,535,857 A | 7/1996 | Barlow | |
| 5,575,112 A | 11/1996 | Scheubel | |
| 5,620,791 A | 4/1997 | Dwivedi et al. | |
| 5,698,240 A | 12/1997 | Haguchi | |
| 5,738,818 A | 4/1998 | Atmur et al. | |
| 5,743,983 A | 4/1998 | Ogata | |
| 5,849,650 A | 12/1998 | Rorabaugh | |
| 5,958,551 A | 9/1999 | Garcia-Ochoa | |
| 6,062,351 A | 5/2000 | Strasser et al. | |
| 6,178,691 B1 | 1/2001 | Caron | |
| 6,180,258 B1 | 1/2001 | Klier | |
| 6,183,852 B1 | 2/2001 | Rorabaugh | |
| 6,193,915 B1 | 2/2001 | Lo et al. | |
| 6,309,743 B1 | 10/2001 | Fujita | |
| 6,358,628 B1 | 3/2002 | Kajikawa et al. | |
| 6,383,656 B1 | 5/2002 | Kimura et al. | |
| 6,544,636 B1 | 4/2003 | Fukunaga et al. | |
| 6,601,284 B1 | 8/2003 | Wall | |
| 6,662,852 B2 | 12/2003 | Gegel | |
| 6,684,561 B2 | 2/2004 | Poret | |
| 6,752,709 B1 | 6/2004 | Skibo et al. | |
| 7,459,110 B2 | 12/2008 | Lenke et al. | |
| 7,793,703 B2 | 9/2010 | Wood et al. | |
| 8,016,018 B2 | 9/2011 | Wood et al. | |
| 8,075,827 B2 | 12/2011 | Loukus et al. | |
| 8,153,541 B2 | 4/2012 | McCullough et al. | |
| 8,455,379 B2 | 6/2013 | McCullough et al. | |
| 8,550,145 B2 | 10/2013 | Wood et al. | |
| 9,429,202 B2 | 8/2016 | Moore et al. | |
| 9,714,686 B2 * | 7/2017 | Moore | C04B 38/06 |
| 2001/0025751 A1 | 10/2001 | Gruber et al. | |
| 2002/0025356 A1 | 2/2002 | Ingram | |
| 2002/0088599 A1 | 7/2002 | Davis et al. | |
| 2002/0117286 A1 | 8/2002 | Fujita | |
| 2003/0038001 A1 | 2/2003 | Yamaguchi et al. | |
| 2003/0159896 A1 | 8/2003 | Koizumi et al. | |
| 2004/0094285 A1 | 5/2004 | Yamaguchi et al. | |
| 2004/0118547 A1 | 6/2004 | Brown et al. | |
| 2004/0177609 A1 | 9/2004 | Moore, III et al. | |
| 2005/0167214 A1 | 8/2005 | Yamamoto et al. | |
| 2005/0181193 A1 | 8/2005 | Lenke | |
| 2005/0183909 A1 | 8/2005 | Rau, III et al. | |
| 2005/0184421 A1 | 8/2005 | de Nagybaczon | |
| 2005/0217950 A1 | 10/2005 | Jolley, Jr. et al. | |
| 2006/0085968 A1 | 4/2006 | Yamaguchi et al. | |
| 2007/0172639 A1 | 7/2007 | Kmetz | |
| 2007/0234929 A1 | 10/2007 | Reinsch et al. | |
| 2007/0284772 A1 | 12/2007 | Goller | |
| 2008/0258343 A1 | 10/2008 | Tado | |
| 2009/0165924 A1 | 7/2009 | Steibel et al. | |
| 2009/0309252 A1 | 12/2009 | Schuetz et al. | |
| 2009/0311541 A1 | 12/2009 | Wood et al. | |
| 2009/0312174 A1 | 12/2009 | McCullough et al. | |
| 2010/0000831 A1 | 1/2010 | Faria | |
| 2010/0001231 A1 | 1/2010 | Loukus et al. | |
| 2010/0126066 A1 | 5/2010 | Devos | |
| 2010/0152015 A1 | 6/2010 | Staudenecker et al. | |
| 2011/0003680 A1 | 1/2011 | Lindermann et al. | |
| 2011/0061830 A1 | 3/2011 | Wood et al. | |
| 2011/0300030 A1 | 12/2011 | Hatomoto | |
| 2012/0080277 A1 | 4/2012 | Wood et al. | |
| 2012/0227624 A1 | 9/2012 | Loukus et al. | |
| 2012/0295784 A1 | 11/2012 | McCullough et al. | |
| 2013/0015607 A1 | 1/2013 | Ueda | |
| 2013/0087420 A1 | 4/2013 | Fraley et al. | |
| 2013/0167440 A1 | 7/2013 | Fischer | |
| 2013/0295304 A1 | 11/2013 | Moore | |
| 2013/0306260 A1 * | 11/2013 | Young, Jr. | D21H 11/12 162/146 |
| 2014/0008893 A1 | 1/2014 | Loukus et al. | |
| 2014/0272451 A1 | 9/2014 | Loukus et al. | |
| 2017/0138081 A1 | 5/2017 | Stevens, Jr. | |

FOREIGN PATENT DOCUMENTS

| | | |
|---|---|---|
| GB | 1309554 A | 3/1973 |
| GB | 2081639 A | 2/1982 |
| JP | 61143534 | 7/1986 |
| JP | 62120449 A | 6/1987 |
| JP | H02194132 | 7/1990 |
| JP | H0344432 | 2/1991 |
| JP | 6108230 | 4/1994 |
| JP | H06114813 A | 4/1994 |
| JP | 2000055904 A | 2/2000 |
| JP | 2001526581 A | 12/2001 |
| JP | 2004360136 | 12/2004 |
| JP | 2009512813 A | 3/2009 |
| WO | 8502394 | 6/1985 |
| WO | 9419172 A1 | 9/1994 |
| WO | 1999011448 | 3/1999 |
| WO | 1999032418 | 7/1999 |
| WO | 2005087575 | 9/2005 |
| WO | 2007033378 | 3/2007 |
| WO | 2009154728 | 12/2009 |
| WO | 2009154734 | 12/2009 |
| WO | 2012076154 | 6/2012 |

OTHER PUBLICATIONS

Wolfgang Kollenberg: "4, Herstellungsverfahren der Keramik" In: "Technische Keramik: Grundlagen-Werkstoffe-Verfahrenstechnik", Feb. 1, 2010, VulkanVerlag, XP055309260, ISBN: 978-3-8027-24-5-3, pp. 376-537.

Search Report for European Patent Application No. 13 784 226.6 dated Mar. 2, 2018.

Dlouhy, A., et al., "Short Fibre Reinforced MMC/ Kurzfaserverstarkter . . . A Quantitative Metallographic Study . . . ," Prakt. Metallogr., vol. 30, pp. 172-185, 1993.

Mukerji, J., "Ceramic Matrix Composites," Defence Science Journal, vol. 43, No. 4, pp. 385-395, Oct. 1993.

KS Aluminium-Technologie AG Brochure, "High-Pressure Die Cast and Squeeze Cast Engine . . . ," 6 pages. www.kspg.com/en/divisions/hardparts/ks-aluminium-technologie/ (Date unknown.).

Everwin, P., et al., "PORSCHE Boxster, LOKASIL®-Zylinderlaufflächen: Eine neue Verbundwerkstoff-Lösung geht mit dem Porsche Boxster in Serie," ATZ. Automobiltechnische Zeitschrift, pp. 66-69, 1996 (in German).

Non-Certified English Translation of Everwin, P., et al., "PORSCHE Boxster, LOKASIL®-Zylinderlaufflächen: Eine neue Verbundwerkstoff-Lösung geht mit dem Porsche Boxster in Serie," ATZ. Automobiltechnische Zeitschrift, pp. 66-69, 1996 Reference. Prepared by Viami International Inc.

Long, S. et al., "Processing of Al-based MMCs by Indirect Squeeze Infiltration of Ceramic Preforms . . . ," pp. 1-23, Jun. 1999.

Evans, A., et al., "Metal Matrix Composites in Industry: An Introduction and a Survey," Kluwer Academic Publishers, p. 241, 2003.

(56) References Cited

OTHER PUBLICATIONS

Lenke, Ilka T., et al., "Design of metal ceramic composites," Int. J. Mat. Res., vol. 97, Issue 5, pp. 676-680, 2006.
Dobrzanski, L.A., "Fabrication of ceramic preforms based on . . . ," Journal of Achievements in Materials and Manufacturing Engineering, vol. 18, Issue 1-2, pp. 71-74, Sep.-Oct. 2006.
Dobrzanski, L.A., "Influence of reinforcement shape on the structure and properties of . . . ," 11th Int'l. Research/Expert Conference, "Trends in the Development of Machinery and Associated Technology," TMT 2007, Hammamet, Tunisia, pp. 1479-1482, Sep. 5-9, 2007.
Unifrax Product Information Sheet, "Fiberfrax Ceramic Fiber Paper," Unifrax I LLC, 4 pages, 2009. www.unifrax.com.
International Search Report and Written Opinion from PCT/US2013/039247, dated Aug. 16, 2013.
Light-Weighting Technology™ by Centruy, Inc., 2 pages. www:lightweighting.com (date unknown).
International Search Report and Written Opinion from PCT/US2014/64624, dated Aug. 11, 2015.
Office Action for U.S. Appl. No. 13/886,113 dated Nov. 20, 2015.
Office Action for U.S. Appl. No. 13/886,113 dated Feb. 26, 2016.
Office Action for U.S. Appl. No. 13/886,113 dated May 21, 2015.
Notice of Allowance for U.S. Appl. No. 13/886,113 dated May 23, 2016.
Office Action for U.S. Appl. No. 14,860,311 dated Aug. 24, 2016.
Response to Office Action dated Feb. 26, 2016 for U.S. Appl. No. 13/886,133.
Office Action for U.S. Appl. No. 12/250,100 dated Dec. 29, 2016.
First Office Action from Chinese Patent Application No. 20140084224.3 dated Dec. 12, 2018.
Notice of Reason for Rejection for Japanese Patent Application No. 2017-540539 dated Nov. 15, 2018.
Extended Search Report for European Patent Application No. EP14904605.4 dated May 25, 2018.
Examination Report for European Patent Application No. 13784226.6 dated May 27, 2019.
English translation of Second Office Action for Chinese Patent Application No. 201480084224.3 dated Aug. 30, 2019.
English translation of Final Office Action for Japanese Patent Application No. 2017-540539 dated Jul. 31, 2019.

\* cited by examiner

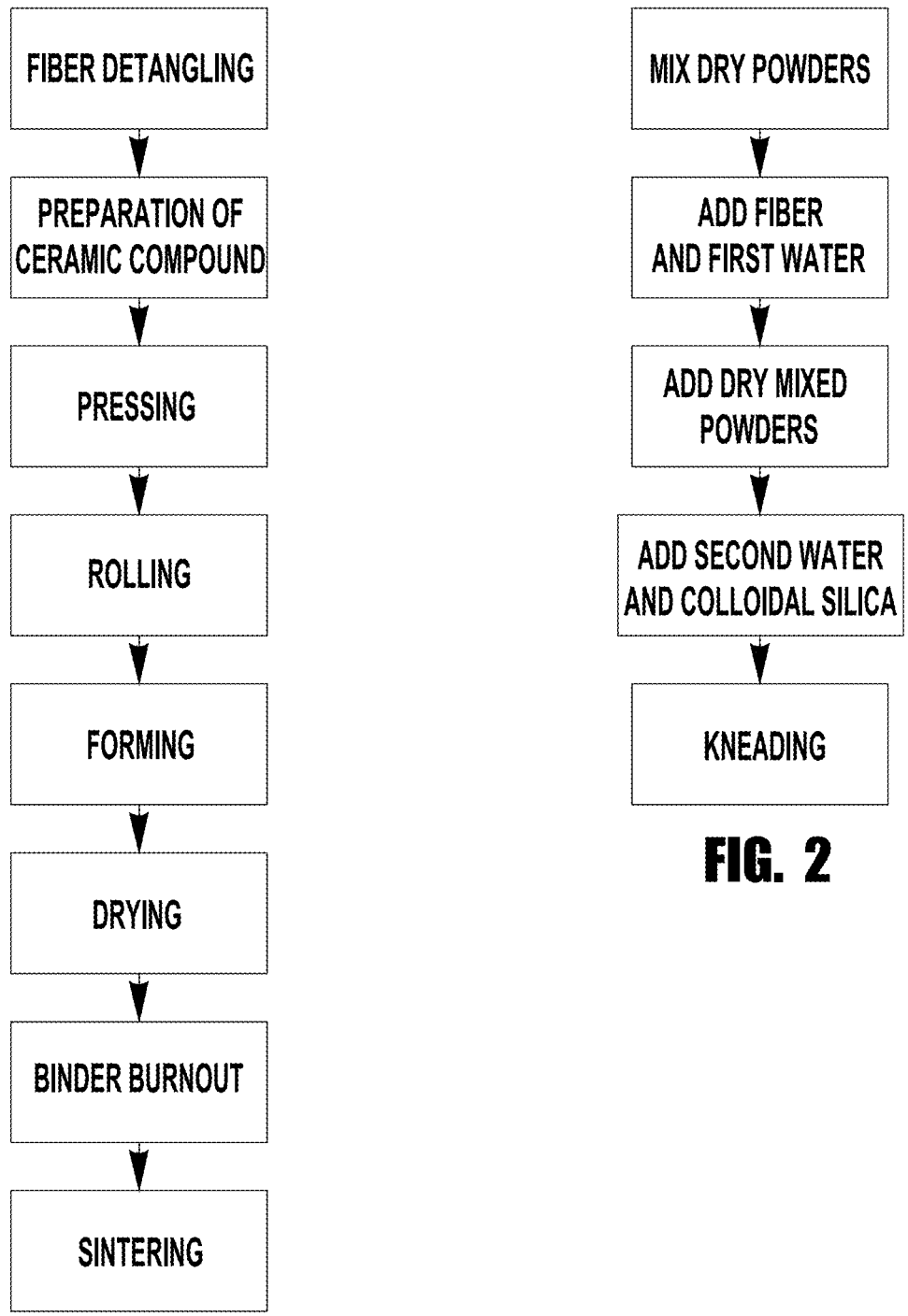

CERAMIC PREFORM AND METHOD

TECHNICAL FIELD

The present application relates generally to ceramics and in particular to ceramic preforms for infiltration with molten metal to form metal matrix composites.

BACKGROUND

A metal matrix composite (MMC) is generally made by incorporating a reinforcing material into a metal matrix. For example, a MMC may comprise a ceramic preform that is infiltrated with a metal. A MMC generally has properties and physical characteristics different from metal that may be desirable depending on the application. Other methods for manufacturing MMC's for brake rotors are hampered by the high manufacturing and material cost of the product and inferior performance of the reinforced brake rotor at high temperature. There is also a need for a ceramic preform with increased strength to withstand handling for metal infiltration.

Vehicles may include drum brakes and/or disc brakes. A drum brake generally comprises a rotating drum-shaped part called a brake drum. Shoes or pads of the drum brake press against the interior surface of the brake drum to cause friction, thereby generating heat, and reduce the rotation of the brake drum. A disc brake generally comprises a rotating brake disc or rotor. Calipers having brake pads that squeeze the exterior and interior of the brake disc to cause friction and reduce the rotation of the brake disc. During the vehicle braking event there is often a high energy transfer to the frictional surface of the brake drum or brake disc which can lead to a rise in temperature, sometimes as high as 700 degrees C. for heavy vehicles such as large trucks or military vehicles.

SUMMARY

The present application discloses a ceramic preform, a method of making a ceramic preform, a MMC comprising a ceramic preform, and a method of making a MMC.

In certain embodiments, the method of making a ceramic preform comprises the steps of detangling a mass of reinforcing fibers to separate the reinforcing fibers into individual strands, preparing a ceramic compound, and forming the ceramic compound into a desired shape to create the ceramic preform. The ceramic compound comprises separated strands of reinforcing fibers, ceramic particles, a fugitive porosity generating component, starch, low temperature organic binder, colloidal silica, and water. Alternatively, the ceramic compound comprises separated strands of reinforcing fiber, ceramic particles, a fugitive porosity generating component, organic adhesive, and a high temperature inorganic binder.

In certain embodiments, the ceramic preform comprises a ceramic compound formed as either a disc or a ring for use in a brake disc metal matrix composite. The ceramic compound comprises between about 41 Wt % and about 47 Wt % ceramic particles; between about 9 Wt % and about 15 Wt % alkaline earth aluminosilicate reinforcing fibers having a diameter greater than 3.5 microns; between about 4.5 Wt % and about 5.5 Wt % fugitive porosity generating component; between about 3 Wt % and about 4 Wt % starch; between about 1.5 Wt % and about 2 Wt % low temperature organic binder; between about 4.5 Wt % and about 11 Wt % colloidal silica; and between about 17 Wt % and about 38 Wt % water.

In certain embodiments, the ceramic preform comprises a ceramic compound formed as either a disc or a ring for use in a brake disc metal matrix composite component. The ceramic compound comprises between about 52 Wt % and about 57 Wt % ceramic particles; between about 11 Wt % and about 17 Wt % alkaline earth aluminosilicate reinforcing fibers having a diameter greater than 3.5 microns; between about 5.5 Wt % and about 7.5 Wt % fugitive porosity generating component; between about 5 Wt % and about 6 Wt % floccing component starch; between about 2 Wt % and about 2.5 Wt % organic adhesive; and between about 6.5 Wt % and about 13 Wt % high temperature inorganic binder.

In certain embodiments, the metal matrix composite comprises the ceramic preform infiltrated with a molten high temperature performance aluminum alloy to form the brake disc metal matrix composite. The method of making the metal matrix composite comprises the steps of heating the ceramic preform to a preheat temperature, placing the ceramic preform in a mold cavity of a die cast mold, and introducing molten metal into the mold cavity such that the metal infiltrates the ceramic preform to form the brake disc metal matrix composite. The preheat temperature of the ceramic preform is greater than the temperature of the molten metal.

These and additional embodiments will become apparent in the course of the following detailed description.

BRIEF DESCRIPTION OF THE DRAWINGS

In the accompanying drawings which are incorporated in and constitute a part of the specification, embodiments of the present application are illustrated, which, together with a general description of the invention given above, and the detailed description given below, serve to example the principles of the inventions.

FIG. 1 illustrates a method of making a ceramic preform according to an embodiment of the present application.

FIG. 2 illustrates a method of making a ceramic compound according to an embodiment of the present application.

DETAILED DESCRIPTION

Figure 3A:
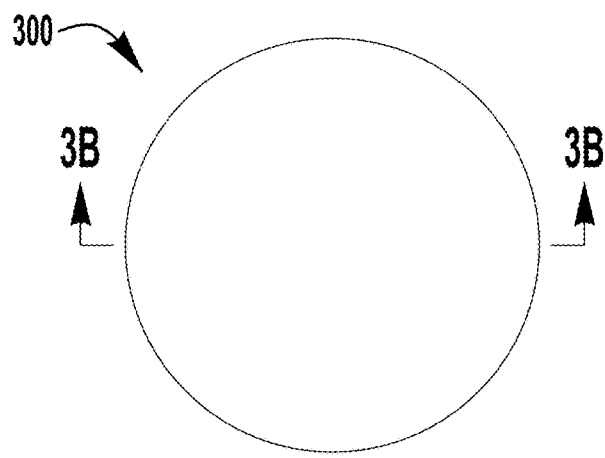
FIGS. 3A and 3B are top and side cross sectional views, respectively, of a ceramic preform blank from which a ceramic preform ring can be cut according to an embodiment of the present application.

The present application discloses a ceramic preform, a method of making a ceramic preform, a MMC comprising a ceramic preform, and a method of making a MMC. The}

MMC of the present application is generally less dense, lighter, stronger at higher temperatures and provides a higher wear resistance than certain metal, non-composite materials used for brake drums and brake discs. For example, an aluminum MMC of the present application generally has greater wear resistance and stiffness (i.e., resistance to deformation) than cast iron. As such, the MMC of the present application is useful in applications where high wear resistance, light weight, and strength is beneficial.

The MMC of the present application may be formed as a brake drum, brake disc or rotor, or any component thereof for a vehicle. For example, the ceramic preform of the present application may be infiltrated with a metal, such as, for example, aluminum alloys and certain special high temperature aluminum alloys, magnesium, titanium, or copper, and form at least a portion of a brake drum or brake disc. In particular, the MMC of the present application generally forms at least a portion of the braking surface of the brake drum or brake disc. The braking surface for the brake drum is generally located on the interior surface of the brake drum that contacts the shoes or pads of the drum brake. The braking surface for the disc brake is generally located on the surfaces of the brake disc that contact the brake pads. The brake drum and brake disc of the present application may be used for virtually any vehicle, including but not limited to, aircraft, trucks, trains, vans, cars, military vehicles, construction vehicles, motorcycles, hybrid vehicles, SUVs, ATVs, and XUVs. However, the MMC of the present application may be formed as a variety of other items, such as, for example, bearings, pistons, cylinder liners, piston rings, connecting rods, aerospace components, armor, or the like.

The MMC brake drums and brake discs of the present application generally have greater wear resistance and less weight than a conventional cast iron brake drums or brake discs. One exemplary method of making a MMC brake drum or brake disc is to insert a ceramic preform of the present application into a direct squeeze-casting machine. Molten metal (e.g., aluminum) is then squeezed under high pressure when the mold halves are closed. The molten metal will infiltrate the porous and/or absorbent ceramic preform and fill the die to produce the MMC brake drum, disc or rotor. One difficulty found in conventional MMC brake drum or disc manufacturing processes is developing a preform with enough strength such that it doesn't break during the handling process, the machining process or when the high pressure molten metal is injected filling the preform and the die. The methods and apparatuses for forming a ceramic preform described in the present application produce a part that is stronger and more dimensionally stable than ceramic preforms made by conventional processes.

In certain embodiments, the ceramic preform of the present application comprises a ceramic compound that has been kneaded, stamped, rolled and formed into a solid disc or a ring-shaped preform. In certain embodiments, the metal matrix composite of the present application comprises a ceramic preform formed in the shape of a ring. The metal matrix composite may be formed as a brake disc or brake drum and the ceramic preform may form at least a portion of a braking surface of the brake disc.

In certain embodiments, the method of making a ceramic preform results in a porous ceramic preform with a porosity between about 60% and 65% and improved strength for handling of the preform during metal infiltration. The high temperature aluminum alloy is introduced into the preform by direct squeeze-casting. The preform infiltrated portion of the brake rotor makes up the surface of the brake rotor that is compressed by the brake pads on the calipers to stop the vehicle.

FIG. 1 illustrates an exemplary method 100 of making a ceramic preform according to an embodiment of the present application. As shown, the method 100 comprises the steps of fiber detangling; preparation of the ceramic compound; pressing, rolling, and forming the ceramic compound; drying; heat treatment for binder burnout; and heat treatment for inorganic binder setting or sintering of the ceramic compound. These steps are described in greater detail below.

The ceramic compound used to make the ceramic preform of the present application may comprise ceramic particles, reinforcing fiber, a fugitive porosity-generating component, starch, organic low temperature binder, colloidal silica suspension, and water. In certain embodiments, the compound does not include water, as shown in the far right column of Table 1, below. Table 1 below shows typical weight percentages for the various components of exemplary ceramic compounds of the present application.

TABLE 1

Exemplary Ceramic Compounds

| Component | Weight Percentage, Wt. % | Weight Percentage, Wt. % 7 vol % fiber | Weight Percentage, Wt. % 10 vol % Fiber | Weight Percentage, Wt. % 10 vol % Fiber |
|---|---|---|---|---|
| Ceramic Particles | 41-47 | 45.7 (42-47) | 41.5 (41-42.5) | 57.5 (53-58) |
| Reinforcing Fibers | 9-15 | 9.1 (9-11) | 11.8 (10-15) | 16.3 (11-17) |
| Fugitive porosity-generating component | 4.5-5.5 | 5.2 (4.5-5.5) | 4.9 (4.5-5.5) | 6.8 (5.5-7.5) |
| Starch | 3-4 | 3.5 (3-4) | 3.3 (3-4) | 4.6 (5-6) |
| Low temperature organic binder | 1.5-2 | 1.7 (1.5-2) | 1.7 (1.5-2) | 2.3 (2-2.5)[1] |
| Colloidal silica | 4.5-11 | 4.9 (4.5-11) | 9.0 (8-11) | 12.5 (6.5-13)[2] |
| Water | 17-38 | 29.8 (17-36) | 27.8 (19-38) | — |

[1]Weight percentage denotes the amount of organic adhesive present in this formulation.
[2]Weight percentage denotes the amount of high temperature binder present in this formulation.

The ceramic particles of the compound typically provide the ceramic preform with wear resistance and hardness. The ceramic particles may comprise a variety of materials, such as, for example, silicon carbide, alumina, boron carbide, or combinations or mixtures thereof. In certain embodiments, the ceramic particles comprise 500 grit silicon carbide particles.

The reinforcing fiber or whisker of the ceramic compound may include short or long fibers and may comprise a variety of materials, such as, for example, carbon, silicon carbide, metallic, or ceramic fibers, whiskers, or chopped filaments. The carbon fiber may be in the form of chopped carbon tape or carbon nanotubes. In certain embodiments, the reinforcing fiber of the ceramic compound is an alkaline earth aluminosilicate fiber, such as, for example, those fibers labeled Fiber D and E in Table 2 below.

The reinforcing fiber of the ceramic compound may be prepared prior to introducing the fiber into the batch of ceramic compound components (see, e.g., Fiber Detangling step in FIG. 1). For example, when an alkaline earth aluminosilicate refractory fiber is used as the reinforcing fiber, the fiber may be prepared prior to introducing the fiber into the batch. The alkaline earth aluminosilicate refractory fiber is spun from melted high purity mineral ores (e.g., melted in an electric arc furnace). The fiber is often received from the manufacturer interlocked together in clumps (e.g., a clumped matted ball of refractory fiber) and including shot glass beads left over from the melt spinning process. At least some pretreatment of the fiber may be needed before introducing the fiber in to the batch such that the fibers are separated into individual strands and the shot glass beads are removed. The alkaline earth aluminosilicate fibers used in the compound of the present application may also be of a compositional family that is high in calcia (CaO) and magnesia (MgO) and may not contain shot when received from the manufacturer. The diameters of alkaline earth glass fibers are generally larger than 3.5 microns which is approximately the diameter of typical aluminosilicate glass fibers (see, e.g., Fiber A of Table 2 below). Alkaline earth aluminosilicate glass fibers are also commercially available at cost effective prices making the total cost of the methods described herein commercially attractive.

The composition and fiber diameter of several exemplary reinforcing fibers is shown in Table 2 below. The formulations in columns labeled Fiber D and Fiber E of Table 2 are alkaline earth aluminosilicate fibers as discussed above.

Burnout and Sintering steps in FIG. 1). Exemplary carbonaceous materials include, but are not limited to, graphite, carbon black, graphene or organic materials with a high carbon content such as, for example, walnut shell flour, pecan shell flour, rice hulls, and saw dust.

In certain embodiments, the low temperature organic binder of the ceramic preform compound is methyl cellulose. When methyl cellulose is used, it is generally heat activated. Further, other binders that may be used including, but not limited to, guar gum and Xanthum gum. After molding of the ceramic compound and exposure to a temperature between, for example, about 49 and 60 degrees C. (or between about 120 and 140 degrees F.), the ceramic preform develops green strength which maintains its shape during handling.

The colloidal silica solution of the ceramic compound is generally flocced with a starch, such as, for example, a cationic corn starch, to provide a high temperature bonding system in the ceramic preform. For example, in certain embodiments, the colloidal silica solution includes colloidal silica particles having a negative surface charge. A cationic starch is positively charged such that there is electrostatic attraction for flocculation to occur. This flocced bonding system is used to bond the refractory fibers and particles of the ceramic compound and contributes to the green strength of the ceramic preform. The effects of the flocculation are noticeable with a highly loaded ceramic body and a minimum amount of water present (e.g., between about 15 and 30%). As discussed in greater detail below, adding a first water amount followed by adding a second water amount with the colloidal silica solution may contribute to the effectiveness of the flocced bonding system.

FIG. 1 illustrates a method 100 of preparing a preform compound according to an embodiment of the present application. As shown, the method 100 begins with a pretreatment step of the fiber that results in detangling of the fiber. For example, a liquid dispersion of bulk fibrous ceramic materials may be separated and de-tangled into individual fibers for introduction into the ceramic compound.

TABLE 2

Exemplary Ceramic Fiber Chemical Compositions, wt %

| Name Compositional family | Fiber A alumina-silica fiber | Fiber B aluimna-silica-zirconia fiber | Fiber C alumina-silica-chromia fiber | Fiber D alkaline earth aluminosilicate fiber | Fiber E alkaline earth aluminosilicate fiber |
|---|---|---|---|---|---|
| $SiO_2$ | 56 | 50 | 54.3 | 38-43 | 40-50 |
| $Al_2O_3$ | 44 | 34.9 | 42.6 | 18-23 | 10-16 |
| CaO + MgO | 0.5 | 0.09 | 0.1 | 23-28 | 20-35 |
| $ZrO_2$ | | 15.2 | | | |
| $Cr_2O_3$ | | | 2.8 | | |
| $Fe_2O_3 + TiO_2$ | 0.15 | 0.15 | 0.15 | | |
| FeO | | | | 4.5-8.0 | |
| $K_2O + Na_2O$ | 0.1 | 0.1 | 0.1 | 4.5 | |
| Others | | | | 6.0 | 6-10 |
| Fiber diameter, μm | 3.5 | 3.5 | 3.5 | 5.5 | 5-6 |

In order for the ceramic preform to be infiltrated with molten metal, it is advantageous to have highly interconnected porosity which creates a continuous pathway for the flow of molten metal. The fugitive porosity-generating component of the ceramic compound permits the ceramic preform to have a highly interconnected porosity. For example, in certain embodiments, the porosity-generating component is a carbonaceous material that will burnout of the molded ceramic article during heat treatment (see, e.g., Binder In certain embodiments, alkaline earth aluminosilicate fibers are received from the manufacturer in a tangled and agglomerated mass. One exemplary method of separating the tangled alkaline earth aluminosilicate fibers into the individual fibers involves first placing a given quantity into a vessel and adding an aqueous solution comprised of distilled water and an alkylolamino amide additive at a 1.0 to 2.5 vol % concentration. The fiber material and solution within the vessel are held in a temperature controlled environment above 70 degrees F. The contents of the vessel are then gently stirred over a minimum period, for example 18 hours. The additive solution is then decanted or poured off from the vessel leaving the treated fiber material on the bottom and sides of the vessel. The fiber is then washed with water to remove any residual additive solution. The vessel may be backfilled with water such that the settled out ceramic fibers become re-dispersed in the water and not caked on the bottom of the vessel. The washing procedure is performed generally at least five times giving adequate time, typically one hour, for the ceramic fibers to settle out so that the wash water can be decanted without the loss of suspended fibers. Water is added to wet the fiber in an amount needed for a first water addition to the batch (e.g., between about 14 wt % and about 27 wt % of the batch composition) so that it can be added to the other batch constituents as an aqueous washed dispersed fiber suspension.

Alternatively, the tangled alkaline earth alumino silicate fibers are detangled or separated into individual fibers by loading the reinforcing fiber and ceramic particles into a pulverizing device—e.g., a ball mill—with grinding media in a rotating drum. Pulverizing disperses the tangled or agglomerated fibers into individual strands. Operation of the pulverizing device, such as the rotation of a ball mill, mixes the fibers and ceramic particles into a homogeneous mixture. In certain embodiments, the duration of the detangling process is about 20 minutes, or about 60 minutes, depending on the size of the pulverizing device.

Figure 7:
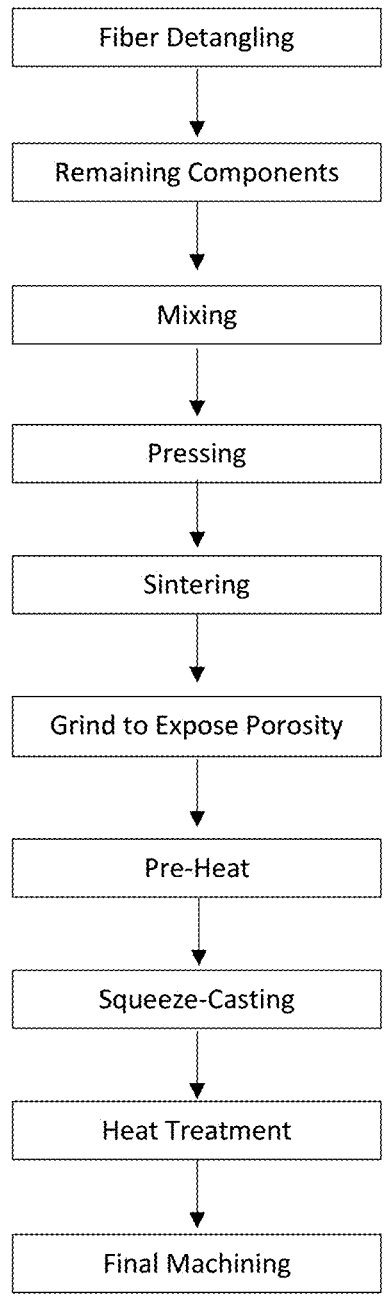
FIG. 7 is a flow chart describing an exemplary method of forming a ceramic preform.

Referring now to FIG. 7, an exemplary method of forming a ceramic preform is shown. As shown, the method includes: fiber detangling; preparation of the ceramic compound; mixing; pressing; sintering of the ceramic compound; grinding to expose highly-interconnected porosity; pre-heating; squeeze-casting; heat treatment; and final machining. These steps are described in greater detail below.

The ceramic compound used to make the ceramic preform of the present application includes ceramic particles, reinforcing fiber, a fugitive porosity-generating component, starch, organic low temperature binder, colloidal silica suspension, and water. In embodiments of the compound not including water, the ceramic compound includes ceramic particles; alkaline earth aluminosilicate reinforcing fibers having a diameter greater than 3.5 microns; a fugitive porosity generating component; a floccing component starch; organic adhesive; and a high temperature inorganic binder. Table 1 above shows typical weight percentages for the various components of exemplary ceramic compounds of the present disclosure.

The ceramic particles of the compound typically provide the ceramic preform with wear resistance and hardness. The ceramic particles may comprise a variety of materials, such as, for example, silicon carbide, alumina, boron carbide, or combinations or mixtures thereof. In certain embodiments, the ceramic particles comprise 500 grit silicon carbide particles.

The reinforcing fiber or whisker of the ceramic compound may include short or long fibers and may comprise a variety of materials, such as, for example, carbon, silicon carbide, metallic, or ceramic fibers, whiskers, or chopped filaments. The carbon fiber may be in the form of chopped carbon tape or carbon nanotubes. In certain embodiments, the reinforcing fiber of the ceramic compound is an alkaline earth aluminosilicate fiber, such as, for example, those fibers labeled Fiber D and E in Table 2 above.

The reinforcing fiber and ceramic particles of the ceramic compound may be prepared prior to introducing the fiber into the batch of ceramic compound components (see, e.g., the Fiber Detangling step in FIG. 7). For example, when an alkaline earth aluminosilicate refractory fiber is used as the reinforcing fiber, the fiber may be prepared prior to introducing the fiber into the batch. The alkaline earth aluminosilicate refractory fiber is spun from melted high purity mineral ores (e.g., melted in an electric arc furnace). The fiber is often received from the manufacturer interlocked together in clumps (e.g., a clumped matted ball of refractory fiber) and including shot glass beads left over from the melt spinning process. At least some pretreatment of the fiber may be needed before introducing the fiber in to the batch such that the fibers are separated into individual strands and the shot glass beads are removed. The alkaline earth aluminosilicate fibers used in the compound of the present application may also be of a compositional family that is high in calcia (CaO) and magnesia (MgO) and may not contain shot when received from the manufacturer. The diameters of alkaline earth glass fibers are generally larger than 3.5 microns which is approximately the diameter of typical aluminosilicate glass fibers (see, e.g., Fiber A of Table 2 below). Alkaline earth aluminosilicate glass fibers are also commercially available at cost effective prices making the total cost of the methods described herein commercially attractive.

The composition and fiber diameter of several exemplary reinforcing fibers is shown in Table 2 above. The formulations in columns labeled Fiber D and Fiber E of Table 2 are alkaline earth aluminosilicate fibers as discussed above.

In order for the ceramic preform to be infiltrated with molten metal, it is advantageous to have highly-interconnected porosity which creates a continuous pathway for the flow of molten metal. The fugitive porosity-generating component of the ceramic compound permits the ceramic preform to have a highly-interconnected porosity. For example, in certain embodiments, the porosity-generating component is a carbonaceous material that will burnout of the molded ceramic article during sintering (see, e.g., the Sintering step in FIG. 7). Exemplary carbonaceous materials include, but are not limited to, graphite, carbon black, graphene, or organic materials with a high carbon content such as, for example, walnut shell flour, pecan shell flour, rice hulls, and saw dust.

In certain embodiments, the organic adhesive used in the ceramic preform is an animal glue. This component of the formulation allows for rigidity and desired shape prior to setting the high temperature binder. This organic component will also be removed in the burnout process in the sintering step (see e.g., the Sintering step of FIG. 7).

The colloidal silica solution of the ceramic compound is generally flocced with a starch, such as, for example, a cationic corn starch, to provide a high temperature bonding system in the ceramic preform. For example, in certain embodiments, the colloidal silica solution includes colloidal silica particles having a negative surface charge. A cationic starch is positively charged such that there is electrostatic attraction for flocculation to occur. This flocced bonding system is used to bond the refractory fibers and particles of the ceramic compound and contributes to the green strength of the ceramic preform. The effects of the flocculation are noticeable with a highly loaded ceramic body and a minimum amount of water present (e.g., between about 15 and 30%). As discussed in greater detail below, adding a first water amount followed by adding a second water amount with the colloidal silica solution may contribute to the effectiveness of the flocced bonding system.

As shown in the exemplary method of FIG. 7, the method begins with a pretreatment step of the fiber that results in detangling of the fiber. For example, a liquid dispersion of bulk fibrous ceramic materials may be separated and detangled into individual fibers for introduction into the ceramic compound.

In certain embodiments, alkaline earth aluminosilicate fibers are received from the manufacturer in a tangled and agglomerated mass. One exemplary method of separating the tangled alkaline earth aluminosilicate fibers into the individual fibers involves loading the reinforcing fiber and ceramic particles into a pulverizing device, such as a ball mill, with grinding media in a rotating drum. This pulverizing device will operate at standard temperatures and pressures, allowing for the entanglements of alkaline earth aluminosilicate fibers to be dispersed into single strand form. The continued mixing of the rotating drum allows for a homogeneous mixture of the fiber and ceramic particles. This detangling technique can be completed in between 20 minutes to an hour depending on the diameter of the pulverizing device.

FIG. 2 illustrates the steps in the method for preparing the ceramic compound. As illustrated, dry powders, such as, for example, the silicon carbide particles, burnout material, starch and organic binder, are added and mixed. For example, in certain embodiments, the silicon carbide particles are dry mixed with the walnut shell flour, starch, and methyl cellulose in a tumble mixer or other suitable mixer for a period of time (e.g., approximately 30 minutes). A US Stoneware Roller Mill, Model 755, with an enclosed cylindrical container may be used for this dry tumbling step.

As illustrated in FIG. 2, the addition of water to the mixture is generally divided into two parts, the first water addition and a second water addition. As discussed above, the first water addition (e.g., between about 14 wt % and about 27 wt % of the batch composition) which is used to form the detangled fiber suspension that is placed in a mixer (e.g., Hobart Mixer) along with the tumbled dry powders discussed above. The mixture is mixed for a period of time (e.g., approximately 20 minutes) with a paddle mixer blade. This amount of wet mixing time generally insures that the starch is completely wetted out in the batch. During the second water addition, a certain amount of water (e.g., between about 3.5 wt % and about 9 wt % of the batch composition) is mixed with the colloidal silica and is added into the mixer and mixed for a period of time (e.g., approximately 1-2 minutes). As such, the batch clumps together. The blade on the mixer is changed from a paddle blade to a dough hook. The ceramic compound is mixed for approximately 1 minute with the dough hook kneading the batch. It is also to be appreciated that a commercially available equipment such as a kneader/extruder available from Charles Ross & Sons, Inc. can be used to work the batch and to extrude the ceramic compound in a continuous ribbon of desired thickness that is then transported on a conveyor belt for a continuous forming operation.

The ceramic compound may be molded to form a brake drum or brake disc preform using a process which generally includes pressing, rolling, and forming the compound as illustrated in FIG. 1. In certain embodiments, a commercial available kneader/extruder can be used to work the batch and to extrude a cylindrical part that is about 6 inches in diameter. The 6-inch diameter cylindrical part is extruded onto a conveyor belt which moves the extruded part to the pressing step. Pressing increases the diameter and reduces thickness of the ceramic compound, for example from a diameter of approximately 6 inches to a diameter of approximately 10 inches and a height of about one inch. The preform may be formed or pressed into any suitable size and shape for the creation of a metal matrix composite component.

As illustrated in FIG. 1, the next step in the method for forming a brake drum or brake disc preform is to roll the ceramic compound. The rolling step removes air pockets from the ceramic compound and contributes to the uniformity of the material. The rolling process further increases the diameter and reduces the height of the ceramic compound, for example to a diameter of approximately 14 inches and a height of about 0.5 inches.

Figure 3B:
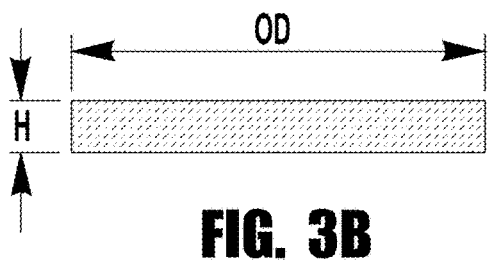

As illustrated in FIG. 1, the ceramic compound is formed (e.g., by stamping or cutting) into a shape for use in a MMC brake drum or brake disc. In certain embodiments, a stamp or die is used to form the ceramic compound into a cylindrical, disc, or ring shape. For example, after the ceramic compound is pressed and rolled, the ceramic compound may be formed as a disc for use as brake disc or rotor preform. FIGS. 3A and 3B illustrate a disc shaped ceramic compound 300 according to an embodiment of the present application. The disc shaped ceramic preform 300 was made by forming a disc shape of the required dimensions from a ceramic compound. In certain embodiments, the outer diameter (OD) of the disc shaped preform 300 is between about 9 inches and about 16 inches and the height (H) is between about ⅛ inch and about 2 inches after the compound has been pressed, rolled and stamped.

Figure 4A:
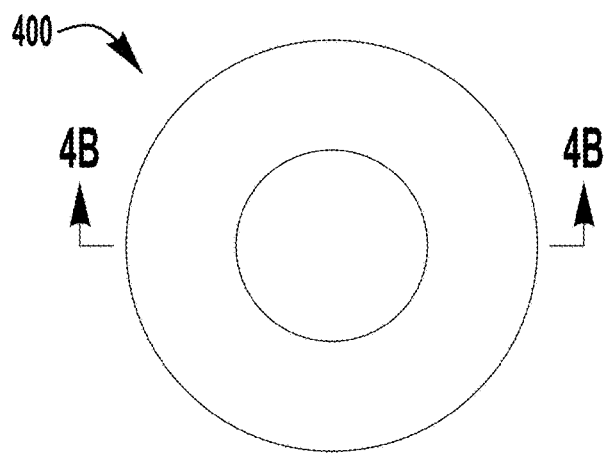
FIGS. 4A and 4B are top and side cross sectional views, respectively, of a ceramic preform according to an embodiment of the present application.
Figure 4B:
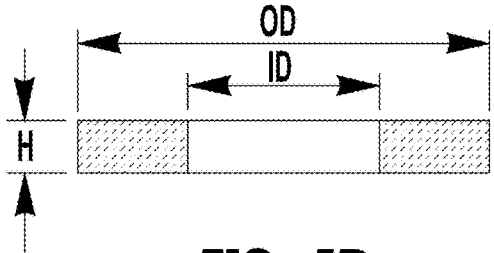

The ceramic compound may also be formed as a ring for use as a brake disc or rotor preform. For example, a stamp or die may be used to stamp or cut a ring-shaped preform from the ceramic compound. FIGS. 4A and 4B illustrate a ring shaped ceramic compound 400 according to an embodiment of the present application. The ring shaped ceramic preform 400 was made by forming a ring shape of the required dimensions from a ceramic compound. In certain embodiments, the outer diameter (OD) of the ring shaped preform 300 is between about 9 inches and about 16 inches; the inner diameter (ID) is between about 5 inches and about 12.5 inches; and the height (H) is between about ⅛ inch and about 2 inches.

The dimensions of the stamped preforms are generally greater than the desired dimensions by a certain amount (e.g., 2%-4% greater) to make possible the final dimensions needed for the brake drum or brake disc or rotor preform, which is to be infiltrated with molten metal to form the MMC. The over-sized dimensions of the stamped preforms allow for shrinkage of the ceramic compound during further processing steps and machining of the preform to the desired dimensions for metal infiltration of the preform.

As illustrated in FIG. 1, after the ceramic preform is formed from the ceramic compound, the ceramic preform goes through the further processing steps of drying, binder burnout, and heat treatment. The ceramic preform is generally dried in the drying oven at a certain temperature (e.g., about 60 degrees C. or about 140 degrees F.) for a period of time. The length of the oven drying time will often vary based on the water content of the ceramic preform and the size of the part. A ceramic preform is generally considered dry when the weight loss is between about 20 wt % and about 35 wt % due to the removal of water from the part.

During the binder burnout step illustrated in FIG. 1, a low temperature heat treatment is conducted to remove the organics or volatile components from the ceramic preform. In certain embodiments, these organics include the walnut shell flour, the starch, and the methyl cellulose. The low temperature heat treatment cycle is generally an approximately 1 hour ramp to a certain temperature (e.g., about 260 degrees C. or about 500 degrees F.) with an approximately two hour hold at about the same temperature.

Sintering is a high temperature heat treatment conducted to seal the ceramic bond created by the colloidal silica. The high temperature heat treatment generally has a hold at a certain temperature (e.g., about 985 degrees C. or about 1800 degrees F.) for approximately two hours. In certain embodiments, after the high temperature heat treatment, the colloidal silica particles remain in the ceramic preform and the ceramic preform comprises silicon carbide particles, refractory fiber and the silicate bond between the silicon carbide particles and the refractory fibers. In these embodiments, the burnout materials, starch, and methyl cellulose are all removed from the porous ceramic preform body after the low and high temperature heat treatments. After the sintering step, the ceramic preform can be cut to shape and/or machined to achieve final dimensional requirements for accepting a ceramic preform into a brake drum or disc brake rotor high pressure die-casting mold.

In one exemplary embodiment, a disc shaped ceramic preform was made by stamping a shape of the required dimensions from the ceramic compound. The ceramic compound formulation was made by combining 43.2 wt. % Silicon Carbide 360 grit particles (Washington Mills Carborex 360), 8.6 wt. % alkaline earth aluminosilicate refractory fiber, 7 vol % fiber (Fibrox Technology LP Fibrox 300D), 4.9% walnut shell flour—100 mesh (Echo-Shell, Inc.), 3.3 wt % flaked cationic corn starch (Wesbond Westar +3), 1.6 wt % hydroxypropyl methyl cellulose (Dow Chemical Methocel™ A4M), 24.1 wt % of first water addition, 4.1 wt % of second water addition and 10.1 wt % colloidal silica solutions (Wesbond Bindzil® 1440). The concentration of fiber in this ceramic compound is 7 vol %. The fiber detangling of the alkaline earth aluminosilicate fiber was accomplished using an aqueous mixture of 2.105 wt % of an alkylolamino amide (Altana Disperbyk-109) in distilled water.

In another exemplary embodiment, a disc shaped ceramic preform was made by stamping a shape of the required dimensions from the ceramic compound. The ceramic was made by combining 41.5 wt. % Silicon Carbide 360 grit particles (Washington Mills Carborex 360), 11.8 wt. % alkaline earth aluminosilicate refractory fiber, 10 vol % fiber (Lapinus Rockseal® R5480-Roxul®1000), 4.9% walnut shell flour—100 mesh (Echo-Shell, Inc.) 3.3 wt % flaked cationic corn starch (Wesbond Westar +3), 1.7 wt % hydroxypropyl methyl cellulose (Dow Chemical Methocel™ A4M), 23.8 wt % of first water addition, 4.0 wt % of second water addition and 9.0 wt % colloidal silica solutions (Wesbond Bindzil® 1440). The ceramic compound was kneaded, pressed, rolled and stamped for form a preform that was approximately 14 inches in diameter and approximately ½ inch thick. The ceramic part was dried, fired for binder burnout, and sintered. The resulting finished part had a weight of approximately 1256 gm and it measured 14.3 inches in diameter and 0.564 inch thick. The composition of the final part was 72.9 wt % silicon carbide, 20.7 wt % alkaline earth aluminosilicate fiber and 6.4 wt % silicate binder.

The ceramic preform of the present application may be infiltrated with a metal, such as, for example, aluminum, magnesium, titanium, or copper, to form a MMC of the present application. For example, the ceramic preform may be introduced into a die-casting mold for infiltration of metals that are capable of being die cast, such as, for example, aluminum, magnesium, or copper, to form a MMC of the present application. Certain high temperature performance aluminum alloys may be used for infiltration. High temperature performance aluminum alloys have improved elevated temperature tensile and creep properties when compared to 356 or A356 die-casting alloys. These high temperature performance aluminum alloys are often used for common rail diesel cylinder heads. The compositional family is the aluminum/silicon/copper alloys (AlSi7Cu) alloys with varying amounts of magnesium, manganese, vanadium, zirconium, titanium and iron (Mg, Mn, V, Zr, Ti and Fe). In certain embodiments, the high temperature performance aluminum alloy comprises AlSi7Cu3.5Mg0.15Mn0.15V0.12Zr0.12Ti0.12 with Fe<0.15%.

A die cast mold generally includes two die parts: a first die part, the lower part or cope, that is generally stationary and coupled to a non-moving platen of the die casting machine and a second die part, the upper part or drag, that is movable relative to the first die part and is generally coupled to a movable platen of the die casting machine. Within a die part is a mold cavity that receives the injected molten metal. The mold cavity is representative of the final product shape with calculated shrink factored in and draft added to aid in part release. In certain embodiments, the amount of shrinkage is between about 0.07% and about 2.19%. The cavity also generally includes a nesting area that accepts and locates the ceramic preform within the mold cavity.

For introduction of the molten metal in a direct squeeze-casting process, the molten metal is introduced from above the preform while the two die parts are open. The pre-heated ceramic preform is placed within the mold cavity of the drag portion of the mold. The molten metal is introduced on top of the preform. The two die parts, cope and drag, are closed applying pressure to the part being infiltrated. Molten metal infiltrates the preform during the squeezing process. The preform is generally at a temperature that is higher than the molten metal during the squeeze casting process. If the molten metal hits a preform of a lower temperature than the metal, the metal freezes in contact with the surface of the preform and does not infiltrate.

The die parts are typically machined from tool steel with various treatments to improve durability. Heating and cooling circuits may also be added throughout the die parts to aid in attaining and retaining optimum temperatures for the casting process. These circuits may use various fluids to transfer temperatures into or out of predetermined areas of the die and are typically placed close to the mold cavity but do not enter the cavity.

The ceramic preform is placed within the mold cavity of the die cast mold. The ceramic preform may be preheated to a certain temperature prior to introduction into the mold cavity. For example, the ceramic preform may be preheated to a temperature that is above the temperature of the molten metal that is being injected into the mold cavity (e.g., aluminum). In certain embodiments, the ceramic preform is heated to at least 50 degrees F. above the temperature of the molten metal that is being injected into the mold cavity. In other embodiments, the ceramic preform is heated to at least 100 degrees F. above the temperature of the molten metal that is being injected into the mold cavity.

Molten metal is injected into the mold cavity at a low velocity and infiltrates the porous body of the ceramic preform. The velocity of the molten metal is such that the ceramic preform does not deform during injection of the molten metal. The molten metal infiltrates substantially through the entire wall thickness. Further, in certain embodiments, the molten metal infiltrates substantially through a ceramic preform having a wall thickness of 2 inches or less.

In one example, a 4×4 inch preform was infiltrated with molten metal to form an Al-MMC. The 4×4 inch preform made by the methods described herein and containing 7 vol % Fiber E from Table 2 (Fibrox Fiber) and silicon carbide particles was infiltrated with a high temperature performance aluminum die-casting alloy. The preform temperature was about 1500° F. and the metal temperature was about 1420° F. The composition of the alloy was 6.83% silicon, 0.125% iron, 3.46% copper, 0.0082% manganese, 0.344% magnesium, 0.129% titanium, 0.114% zirconium, 0.114% vanadium and a balance of aluminum. The pressure exerted during the squeeze casting on the sample was 12,570 pounds per square inch with a dwell time of 9 seconds. The preform sample was completely infiltrated with metal. The sharp corners of the preform edges of the infiltrated sample were maintained indicating that there was no deformation of the preform during the squeeze casting. Microstructure development of the high temperature alloy was developed with a solution heat treatment at 941° F. (505° C.) for five hours followed by a water quench. Subsequently, the preform sat at room temperature in air for 24 hours before an aging heat treatment at 392° F. (200° C.) for five hours.

Figure 5B:
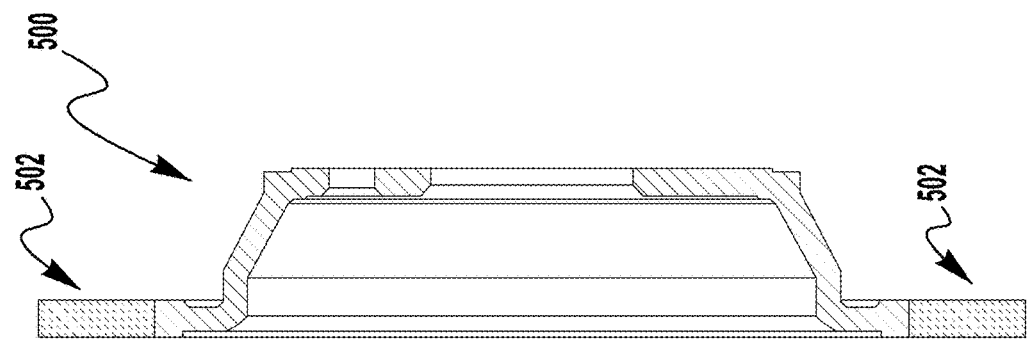
FIG. 5B is a side cross sectional view of the metal matrix composite brake disc of FIG. 5A.
Figure 5A:
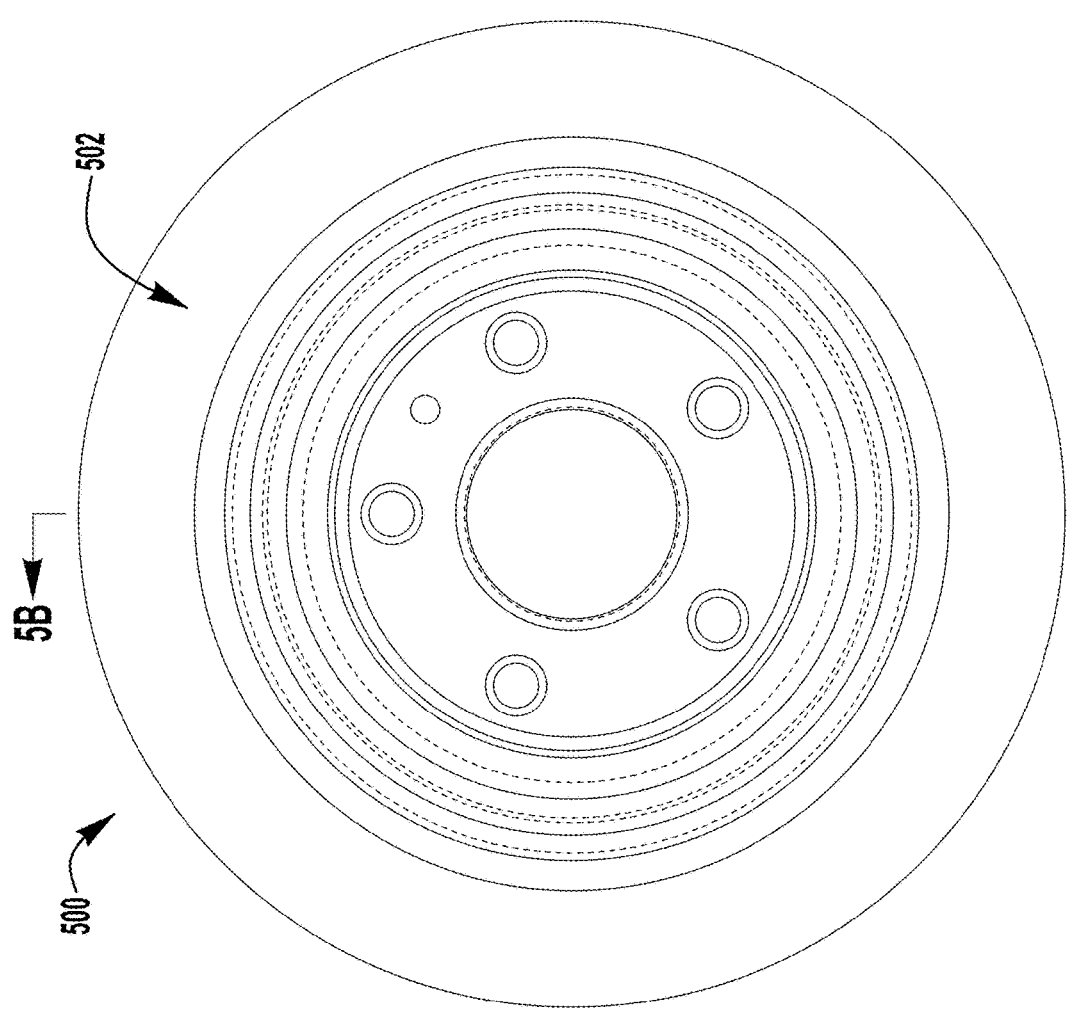
FIG. 5A is a top view of a metal matrix composite brake disc according to an embodiment of the present application.

FIGS. 5A and 5B illustrate a MMC brake disc 500 according to an embodiment of the present application. As shown, the MMC brake disc 500 is formed using a ring shaped ceramic preform 502 having approximately the same shape as the MMC brake disc. Each ceramic preform was infiltrated with a metal (e.g., aluminum) to form the MMC brake disc 500, such as during a direct squeeze die casting process as discussed herein. The ceramic preform 502 and MMC brake disc 500 may be a variety of sizes and shapes for a variety of different vehicles. For example, in certain embodiments, the MMC brake disc 500 is between about 9 inches and about 16 inches in diameter and between about ⅛ and about 2 inches thick.

Figure 6B:
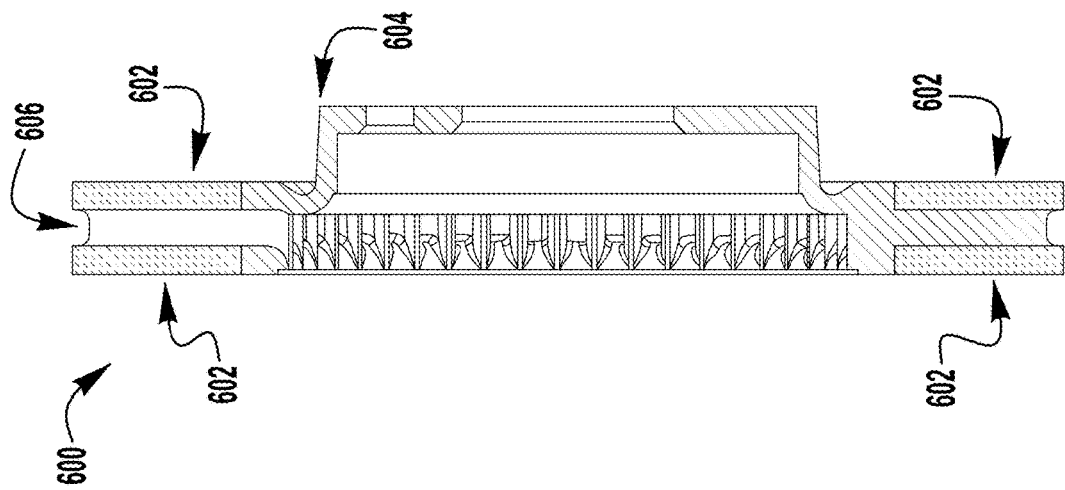
FIG. 6B is a side cross sectional view of the metal matrix composite brake disc of FIG. 6A.
Figure 6A:
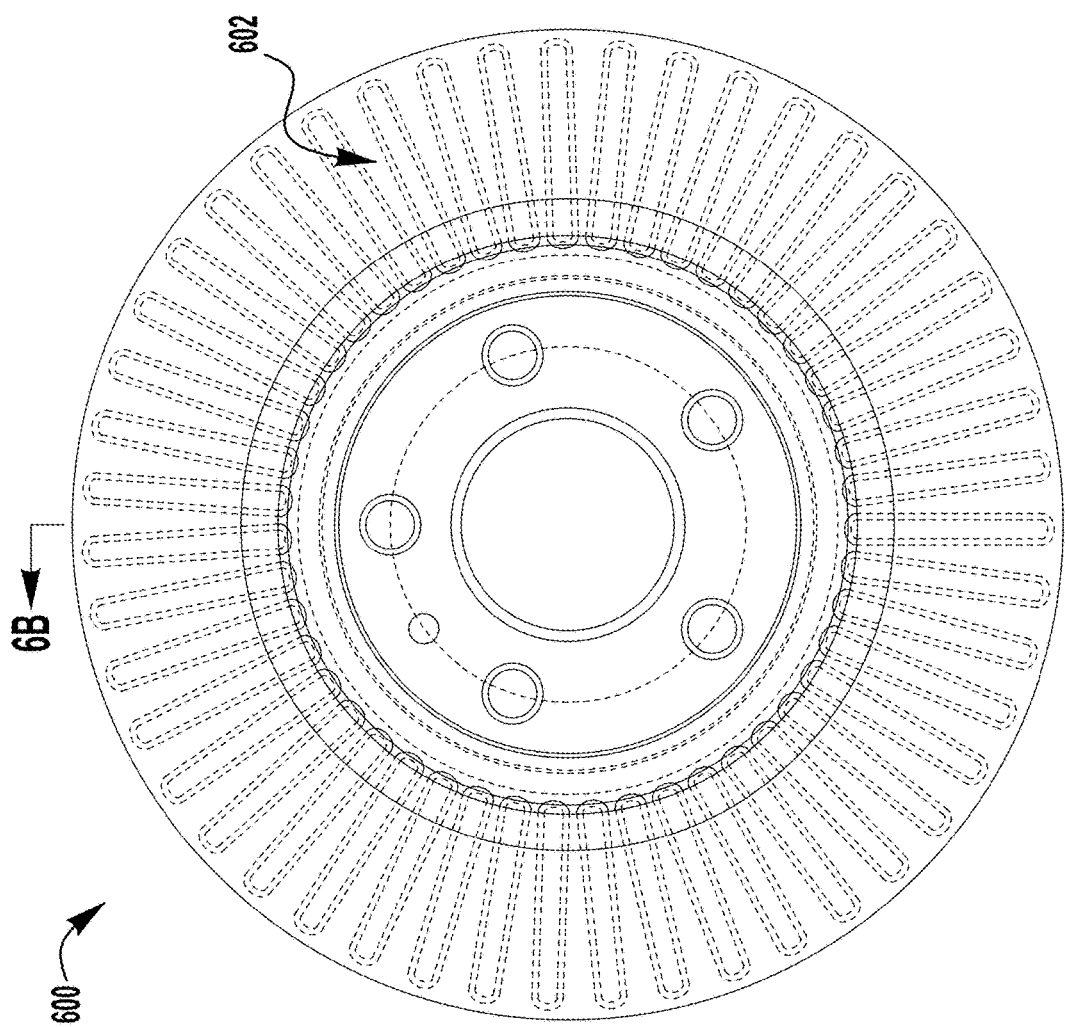
FIG. 6A is a top view of a metal matrix composite brake disc according to an embodiment of the present application.

FIGS. 6A and 6B illustrate a MMC brake disc 600 according to an embodiment of the present application. As shown, the MMC brake disc comprises a vented and finned brake disc design having a raised center portion or hat 604 and a channel 606 that facilitates cooling of the disc brakes. Further, as illustrated in FIG. 6B, the MMC brake disc 600 has two reinforced ceramic surfaces formed using two ring shaped ceramic preforms 602 having approximately the same shape as the MMC brake disc. These ceramic surfaces are engaged by the brake calipers for stopping the vehicle. Each ceramic preform 602 was infiltrated with a metal (e.g., aluminum) to form the MMC brake disc 600, such as during a die casting process as discussed herein. The ceramic preforms 602 and MMC brake disc 600 may be a variety of sizes and shapes for a variety of different vehicles. For example, in certain embodiments, the MMC brake disc 600 is between about 9 inches and about 16 inches in diameter and between about 1 inch and about 2.0 inches thick.

The strength of the ceramic preform facilitates the handling that is required to prepare the ceramic preform for placement in the die-casting mold. The ceramic preform disclosed herein have improved strength over similar type preforms made using a different forming method.

For example, five ceramic preforms of different composition were produced and the bulk density, porosity and compressive strength of each preform was measured. Table 3 below shows the bulk density and porosity as measured by ASTM C830 and the compressive strength as measured by ASTM C133 for the five ceramic preforms (Preforms 1-5). Four of the five ceramic preforms (Preforms 2-5) were made using the same method described herein and illustrated in FIGS. 1 and 2.

For Preform 2, the ceramic preform formulation was made by combining 43.2 wt. % Silicon Carbide 360 grit particles; 8.6 wt. % Fiber D, an alkaline earth aluminosilicate refractory fiber with a fiber diameter of approximately 5.5 micron; 4.9% walnut shell flour—100 mesh; 3.3 wt % flaked cationic corn starch 1.6 wt % hydroxypropyl methyl cellulose; 24.1 wt % of first water addition; 4.1 wt % of second water addition; and 10.1 wt % colloidal silica solutions. The concentration of fiber in this ceramic compound is 7 vol %. The fiber detangling of the alkaline earth aluminosilicate fiber was accomplished using an aqueous mixture of 2.105 wt % of an alkylolamino amide in distilled water.

For Preform 3, the ceramic preform formulation was made by combining 43.2 wt. % Silicon Carbide 360 grit particles; 8.6 wt. % Fiber E, an alkaline earth aluminosilicate refractory fiber with a fiber diameter of 5-6 microns by population; 4.9% walnut shell flour—100 mesh; 3.3 wt % flaked cationic corn starch; 1.6 wt % hydroxypropyl methyl cellulose; 24.1 wt % of first water addition; 4.1 wt % of second water addition; and 10.1 wt % colloidal silica solutions. The concentration of fiber in this ceramic compound is 7 vol %. The fiber detangling of the alkaline earth aluminosilicate fiber was accomplished using an aqueous mixture of 2.0 wt % of an alkylolamino amide in distilled water.

For Preform 4, the ceramic preform formulation was made by combining 41.5 wt. % Silicon Carbide 360 grit particles; 11.8 wt. % Fiber D, an alkaline earth aluminosilicate refractory fiber with a fiber diameter of approximately 5.5 micron; 4.9% walnut shell flour—100 mesh; 3.3 wt % flaked cationic corn starch; 1.7 wt % hydroxypropyl methyl cellulose; 23.8 wt % of first water addition; 4.0 wt % of second water addition; and 9.0 wt % colloidal silica solution. The concentration of fiber in this ceramic compound is 10 vol %. The fiber detangling of the alkaline earth aluminosilicate fiber was accomplished using an aqueous mixture of 2.0 wt % of an alkylolamino amide in distilled water.

For Preform 5, the ceramic preform formulation was made by combining 41.5 wt. % Silicon Carbide 360 grit particles; 11.8 wt. % Fiber E, an alkaline earth aluminosilicate refractory fiber with a fiber diameter of 5-6 microns by population; 4.9% walnut shell flour—100 mesh; 3.3 wt % flaked cationic corn starch; 1.7 wt % hydroxypropyl methyl cellulose; 23.8 wt % of first water addition; 4.0 wt % of second water addition; and 9.0 wt % colloidal silica solution. The concentration of fiber in this ceramic compound is 10 vol %. The fiber detangling of the alkaline earth aluminosilicate fiber was accomplished using an aqueous mixture of 2.0 wt % of an alkylolamino amide in distilled water.

Preform 1 was a ceramic preform made by combining 47.63 wt % Silicon Carbide 360 grit particles; 9.53 wt % hammermilled and sieved Fiber A, an aluminosilicate refractory fiber with a fiber diameter of 3.5 micron; 5.4 wt % walnut shell flour—100 mesh; 3.63 wt % flaked cationic corn starch; 1.77 wt % hydroxypropyl methyl cellulose; 11.3 wt. % of first water addition; 9.64 wt % of second water addition; and 11.1 wt % colloidal silica solution. The process for preparing the fiber for introduction into the batch included the steps of hammermilling and sieving the fiber received from the manufacturer. After hammermilling, the fiber included less shot and consisted of clumps that were less than about 6 mm in length. The fiber clumps were then pressed to further break down the clumps. The pressed fiber was then screened (e.g., through a 500 micron wire mesh screen) to remove loose shot (e.g., shot having a diameter greater than 500 microns). The fiber left on top of the screen was then added to the batch of ceramic compound components. The fiber added to the batch after this pre-treatment was in the form of small clumps of fiber that were not fully detangled.

Table 3 below shows the bulk density and porosity as measured by ASTM C830 and the compressive strength as measured by ASTM C133 for the five ceramic preforms 1-5. The compressive strength is measured parallel and perpendicular to the pressing direction of the ceramic preform. As shown, the formulations made by the methods disclosed herein and using Fiber D and Fiber E (i.e., Preforms 2-5) have increased strength by approximately as much as a factor of four over the formulation using Fiber A.

TABLE 3

Bulk Density, Porosity and Strength of Various Ceramic Preforms

| Preform | 1 | 2 | 3 | 4 | 5 |
|---|---|---|---|---|---|
| Fiber | 7 vol % Fiber A | 7 vol % Fiber D | 7 vol % Fiber E | 10 vol % Fiber D | 10 vol % Fiber E |
| Bulk density, g/cc | 1.05 | 1.02 | 1.00 | 0.96 | 1.01 |
| Porosity, % | 65 | 66 | 67 | 68 | 67 |
| Strength, psi (parallel/perpedicular to pressing direction) | 40/40 | 145/214 | 190/200 | 150/250 | 97/210 |

It is believed that Preforms 2-5 are stronger than Preform 1 due to the well dispersed fibers within the ceramic formulation of Preforms 2-5 having larger fiber diameters than Preform 1 (5-6 microns vs. 3.5 microns). The individually separated larger diameter fibers in Preforms 2-5 is able to create an interlocking structure between the fiber and silicon carbide particles that is very strong. This interlocking strong network is held together by a silicate bond. The pretreatment of Fiber A is laborious, costly and wasteful as half of the received fiber is used as a raw material in the ceramic formulation. Fiber A includes 50 wt % useable fiber and 50 wt % shot. Shot is unacceptable in a ceramic preform used for a brake disc or rotor, or a brake drum, because when a shot particle is on the braking surface the braking event may be compromised. The aqueous detangling process for the fiber using an alkykolamino amide additive incorporated into the processing of Preforms 2-5 is simple, lends itself to a scaleable manufacturing process, and is cost effective.

As described herein, when one or more components are described as being connected, joined, affixed, coupled, attached, or otherwise interconnected, such interconnection may be direct as between the components or may be in direct such as through the use of one or more intermediary components. Also as described herein, reference to a "member," "component," or "portion" shall not be limited to a single structural member, component, or element but can include an assembly of components, members or elements.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasably or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

What is claimed is:

1. A method of making a ceramic preform, comprising the steps of:
    using a mass of entangled alkaline earth aluminosilicate reinforcing fibers;
    detangling the mass of entangled reinforcing fibers with a pulverizing device to separate the reinforcing fibers into individual strands to form detangled reinforcing fibers;
    preparing a ceramic compound, the ceramic compound comprising the detangled reinforcing fibers, ceramic particles, a fugitive porosity generating component, low temperature organic binder, and a high temperature bonding system for forming a silicate bond between the detangled reinforcing fibers and the ceramic particles; and
    forming the ceramic compound into a desired shape to create the ceramic preform;

wherein the detangling and preparing steps are performed simultaneously with the pulverizing device.

2. The method of claim 1, wherein the ceramic compound comprises:
   between about 41 Wt % and about 47 Wt % ceramic particles;
   between about 9 Wt % and about 15 Wt % reinforcing fibers; and
   between about 4.5 Wt % and about 11 Wt % high temperature inorganic binder.

3. The method of claim 2, wherein the ceramic particles are silicon carbide particles.

4. The method of claim 1, wherein the reinforcing fibers are alkaline earth aluminosilicate reinforcing fibers comprising between about 38 Wt % and about 43 Wt % $SiO_2$, between about 18 Wt % and about 23 Wt % $Al_2O_3$, and between about 23 Wt % and about 28 Wt % CaO+MgO.

5. The method of claim 1, wherein the reinforcing fibers are alkaline earth aluminosilicate reinforcing fibers comprising between about 40 Wt % and about 50 Wt % $SiO_2$, between about 10 Wt % and about 16 Wt % $Al_2O_3$, and between about 20 Wt % and about 35 Wt % CaO+MgO.

6. The method of claim 1, wherein the pulverizing device is a ball mill.

7. The method of claim 1, wherein the detangled reinforcing fibers, ceramic particles, fugitive porosity generating component, low temperature organic binder, and high temperature inorganic binder are mixed together in the same mixing operation to form the ceramic compound.

8. The method of claim 1, further comprising pressing the ceramic compound.

9. The method of claim 1, wherein the ceramic compound is formed as either a disc, a ring, a cylinder, or a tube for use in a metal matrix composite vehicle component.

10. The method of claim 1, further comprising:
   heat treating the ceramic preform at a temperature sufficient to remove the fugitive porosity generating component and the low temperature organic binder from the ceramic preform; and
   heat treating the ceramic preform at a temperature sufficient to set the ceramic bond created by the high temperature inorganic binder.

11. The method of claim 1, wherein the reinforcing fibers have a diameter greater than 3.5 microns.

12. The method of claim 11, wherein the diameter of the reinforcing fibers is between 5 and 6 microns.

13. The method of claim 1, wherein the detangling step has a duration between about 20 and about 60 minutes.

14. The method of claim 1, wherein the ceramic compound is prepared with a mixer.

15. The method of claim 14, wherein the mixer is not an extruder.

16. The method of claim 1, wherein the ceramic compound is prepared in the pulverizing device.

17. The method of claim 1, wherein the mass of entangled alkaline earth aluminosilicate reinforcing fibers is a shot free mass of entangled alkaline earth aluminosilicate reinforcing fibers.

18. The method of claim 6, wherein the mass of entangled alkaline earth aluminosilicate reinforcing fibers, ceramic particles, and grinding media are loaded into a rotating drum of the ball mill.

19. The method of claim 18, wherein the mass of entangled alkaline earth aluminosilicate reinforcing fibers, ceramic particles, and grinding media are milled in the ball mill until a homogenous mixture of detangled reinforcing fibers and ceramic particles is formed.

20. A method of making a ceramic preform, comprising the steps of:
   using a mass of entangled alkaline earth aluminosilicate reinforcing fibers;
   preparing a ceramic compound by mixing the mass of entangled alkaline earth aluminosilicate reinforcing fibers, ceramic particles, a fugitive porosity generating component, low temperature organic binder, and a high temperature bonding system in a pulverizing device, wherein during mixing the pulverizing device detangles the mass of entangled reinforcing fibers to separate the reinforcing fibers into individual strands to form detangled reinforcing fibers;
   forming the ceramic compound into a desired shape to create the ceramic preform.

* * * * *